United States Patent [19]
Schmid et al.

[11] Patent Number: 6,037,409
[45] Date of Patent: Mar. 14, 2000

[54] THERMOFORMED ARTICLE HAVING LOW GLOSS AND A COMPOSITION FOR ITS PREPARATION

[75] Inventors: Charles G. Schmid, Belchertown; Donald P. Nardi, Hampden, both of Mass.

[73] Assignee: Bayer Corporation, Pittsburgh, Pa.

[21] Appl. No.: 09/042,068

[22] Filed: Mar. 13, 1998

Related U.S. Application Data

[63] Continuation-in-part of application No. 08/742,098, Oct. 31, 1996, abandoned.

[51] Int. Cl.[7] .................................................... C08L 75/08
[52] U.S. Cl. .................................................................. 525/66
[58] Field of Search .............................................. 525/66

[56] References Cited

U.S. PATENT DOCUMENTS

| | | | |
|---|---|---|---|
| 3,049,505 | 8/1962 | Grabowski | 260/45.4 |
| 4,179,479 | 12/1979 | Carter, Jr. | 525/66 |
| 4,317,890 | 3/1982 | Goyert et al. | 525/66 |
| 4,342,847 | 8/1982 | Goyert et al. | 525/66 |
| 5,055,525 | 10/1991 | Henton et al. | 525/66 |
| 5,216,062 | 6/1993 | Lausberg | 525/66 |
| 5,237,000 | 8/1993 | Lausberg | 525/66 |
| 5,237,001 | 8/1993 | Piejko | 525/66 |
| 5,260,375 | 11/1993 | Lausberg | 525/66 |
| 5,491,194 | 2/1996 | Henton et al. | 525/66 |

FOREIGN PATENT DOCUMENTS

| | | |
|---|---|---|
| 1231488 | 1/1988 | Canada . |
| 2011871 | 9/1990 | Canada . |
| 0 012 343 | 6/1980 | European Pat. Off. . |
| 3931419 | 4/1991 | Germany . |

*Primary Examiner*—Patricia A. Short
*Attorney, Agent, or Firm*—Joseph C. Gil; Aron Preis

[57] ABSTRACT

A thermoplastic composition comprising a resinous blend of a polyether-polyol based thermoplastic polyurethane having a Shore A hardness no greater than 90, and a grafted polybutadiene rubber is disclosed. In the inventive composition, the relative amount in the blend of polyurethane predominates the amount of grafted polybutadiene rubber. The composition is especially suitable for the preparation, by thermoforming, of articles having low gloss which are additionally characterized by their "soft-touch". Also disclosed is a method for reducing the 60 degree gloss of a thermoformed article prepared from a thermoplastic composition containing a blend of thermoplastic polyurethane and grafted polybutadiene rubber.

7 Claims, No Drawings

6,037,409

THERMOFORMED ARTICLE HAVING LOW GLOSS AND A COMPOSITION FOR ITS PREPARATION

CROSS REFERENCE TO RELATED APPLICATIONS

This application is a Continuation-In-Part of U.S. Ser. No. 08/742,098 filed Oct. 31, 1996, now abandoned.

FIELD OF THE INVENTION

The invention concerns thermoplastic molding compositions and more particularly compositions suitable for thermoforming articles having low 60 degree gloss value.

SUMMARY OF THE INVENTION

A thermoplastic composition comprising a resinous blend of a polyether-polyol based thermoplastic polyurethane having a Shore A hardness no greater than 90, and a grafted polybutadiene rubber is disclosed. In the inventive composition, the relative amount in the blend of polyurethane predominates the amount of grafted polybutadiene rubber. The composition is especially suitable for the preparation, by thermoforming, of articles having low gloss which are additionally characterized by their "soft-touch". Also disclosed is a method for reducing the 60 degree gloss of a thermoformed article prepared from a thermoplastic composition containing a blend of thermoplastic polyurethane and grafted polybutadiene rubber.

BACKGROUND OF THE INVENTION

Molding compositions containing thermoplastic polyurethane (herein "TPU") and graft polymers of olefinically unsaturated monomers are known. Compositions of this type and having good mechanical properties, most notably tear resistance, were disclosed in U.S. Pat. No. 3,049,505. Also noted is U.S. Pat. No. 4,317,890 which disclosed relevant compositions which contain a predominant amount of TPU. In this patent there is no distinction made between polyether-polyol based TPU's and their polyester-polyol based counterparts. Compositions containing polyether-polyol derived TPU, ABS and an acrylic polymer processing aid additive have been disclosed in U.S. Pat. No. 4,179,479. Nothing is disclosed in this document relative to gloss values or to thermoformed articles prepared from the compositions. Injection molded compositions said to exhibit improved strength, expansion coefficient, wear, gasoline and hydrolysis resistance were disclosed in German DOS 3,931,419. Nothing relative to thermoforming or the attainment of low gloss has thus been disclosed. U.S. Pat. Nos. 4,317,890 and 4,342,847 both disclosed compositions containing TPU and ABS, yet neither evidenced a recognition in this context of the critical difference between polyether polyol-based TPU and its polyester polyol based counterparts.

Also relevant is U.S. Pat. No. 5,491,194 which disclosed a composition containing a thermally processable, high modulus polyurethane and mass-polymerized ABS, the composition said to exhibit improved solvent resistance and greater impact strength and stiffness than the comparable composition which is based on emulsion-ABS. The polyurethane component of the disclosed composition is characterized in that its tensile modulus is at least 150,000 psi. Further relevant is U.S. Pat. No. 5,055,525 which disclosed a composition containing relevant rubber, including ABS, and a polyester polyol-based TPU. The composition is said to exhibit low temperature impact strength. In fact, the disclosure, in column 6 line 34, et seq., teaches away from using polyether polyol-based TPU (wherein 50 percent or more of the of the soft segment content is composed of ether-linked repeating units) in the context of that invention.

The present invention is directed to a thermoplastic composition especially suitable for the preparation of thermoformed articles having low gloss and "soft-touch". These articles have in recent years found applicability in the preparation of interior automotive parts.

DETAILED DESCRIPTION OF THE INVENTION

The present invention is based on the finding that the inventive composition which comprises polyether-polyol based thermoplastic polyurethane is suitable for preparing thermoformed articles having a low 60 degree gloss value. The gloss value was found to be lower than the value measured on a identically prepared article made of a corresponding composition wherein polyurethane is one based on polyester-polyol. The thermoplastic composition of the present invention comprises a resinous blend of (i) about 51 to 85% by weight of a polyether-polyol based thermoplastic polyurethane having a Shore A hardness no greater than 90, preferably about 65 to 87, and (ii) about 15 to 49% by weight of grafted polybutadiene rubber having a grafted phase containing a copolymer of a monovinylidene aromatic monomer and at least one member selected from the group consisting of (a) an ethylenically unsaturated nitrile and (b) an ethylenically unsaturated ester. The percents are relative to the weight of the blend. Importantly, the composition is characterized in that it contains no additional acrylic polymer components. In a preferred embodiment, the blend contains 55 to 85%,more preferably 60 to 80% of thermoplastic polyurethane.

An additional embodiment of the invention is directed to a thermoplastic composition which is characterized in that thermoformed articles made therefrom have low gloss values. The composition contains a resinous blend of (i) about 51 to 85%, preferably 55 to 85%, most preferably 60 to 80%, by weight of a polyether-polyol based thermoplastic polyurethane having a Shore A hardness no greater than 90 preferably about 65 to 87, and (ii) about 15 to 49%, preferably 15 to 45%, most preferably 20 to 40% by weight of grafted polybutadiene rubber having a grafted phase containing a copolymer of a monovinylidene aromatic monomer and at least one member selected from the group consisting of (a) an ethylenically unsaturated nitrile and (b) an ethylenically unsaturated ester. Importantly, the composition is characterized in that it contains no additional acrylic polymer components. The percents are relative to the weight of the blend. The lower gloss is in comparison to a corresponding article prepared from a composition wherein polyurethane is based on polyester-polyol.

An additional embodiment of the invention is directed to a thermoformed article having a low 60 degree gloss value. The article is prepared from a thermoplastic composition comprising a resinous blend of (i) about 51 to 85%, preferably 55 to 85%, most preferably 60 to 80%, by weight of a polyether-polyol based thermoplastic polyurethane having a Shore A hardness no greater than 90 preferably about 65 to 87, and (ii) about 15 to 49%, preferably 15 to 45%, most preferably 20 to 40% by weight of grafted polybutadiene rubber having a grafted phase containing a copolymer of a monovinylidene aromatic monomer and at least one member selected from the group consisting of (a) an ethylenically unsaturated nitrile and (b) an ethylenically unsaturated ester.

The percents being relative to the weight of the blend. The low gloss is in comparison to a corresponding article prepared from a composition wherein polyurethane is based on polyester-polyol.

A yet additional embodiment of the invention is directed to a method to reduce the 60 degree gloss of a thermoformed article prepared from a thermoplastic composition containing a blend of (i) about 51 to 85% by weight of a thermoplastic polyurethane based on polyester-polyol having a Shore A hardness no greater than 90 preferably about 65 to 87 and (ii) about 15 to 49% by weight of grafted polybutadiene rubber having a grafted phase containing a copolymer of a monovinylidene aromatic monomer and at least one member selected from the group consisting of (a) an ethylenically unsaturated nitrile and (b) an ethylenically unsaturated ester. The inventive method comprises replacing at least a portion of the polyester-polyol based polyurethane by a corresponding polyether-polyol based thermoplastic polyurethane. The percents being relative to the weight of the blend.

Articles made of the inventive composition, most notably thermoformed articles, are noted for their low gloss and soft-touch quality. The soft-touch property is believed to be a consequence of the low hardness of the resinous components.

Thermoplastic polyurethane resin suitable in the context of the present invention (herein "TPU-PE") are substantially linear thermoplasts prepared from a diisocyanate, a hydroxyether polyol and a chain extender. These are characterized in that they contain structural units derived from a hydroxyether polyol and by their hardness, measured as Shore A, which is equal to or lower than 90. This hardness is also reflected by the low tensile modulus of TPU-PE which is below 50,000 psi and in their urethane density which is typically equal to or smaller than 3.0 moles per kilogram of TPU-PE. In the preparation of TPU-PE, the relative amounts of the A component (diisocyanate) and the B component (long chain polyether polyol and chain extender) are selected so that the equivalent ratio of isocyanate to isocyanate-reactive compounds is about 0.95 to 1.05. The hardness of the TPU-PE are known to be also controlled by the quantity and type of the chain extender employed in its preparation. Smaller amounts of chain extender generally yield greater softness. TPU-PE resins are known and are readily available in commerce. Among the commercial resins, mention may be made of Texin 985 thermoplastic polyurethane, a product of Bayer Corporation. In the present context, the polyester-polyol based thermoplastic polyurethane, herein sometimes referred to as "TPU-PS", is a resin which is in all respect, save one, identical to TPU-PE; the difference being that its structure contains a predominance of units derived from a polyester-polyol. The synthesis of TPU-PE (and of TPU-PS) resins is known and has been disclosed, e.g., in U.S. Pat. No. 3,214,411, the specification of which is incorporated herein by reference.

The hydroxyether polyols is preferably at least one member selected from the group consisting of ethylene oxide, propylene oxide and tetrahydrofuran having a number average molecular weight of about 600 to 3000. Suitable polyols are disclosed, for instance, in U.S. Pat. Nos. 3,963,697; 3,984,607; and 4,035,213, the specification of which are incorporated herein by reference.

Suitable organic diisocyanate for use in accordance with the invention include the known aliphatic, cycloaliphatic and aromatic diisocyanates. While the diphenylmethane diisocyanate isomers, particularly 4,4'-diisocyanatodiphenylmethane, are the most preferred organic diisocyanates, other preferred diisocyanates include napthylene-1,5-diisocyanate, 3,3'-dimethyl-4,4'-diisocyanato-biphenyl, 1,4-diisocyanatobenzene and the corresponding hydrogenated product, toluene diisocyanate, ethylene diisocyanate, ethylidene diisocyanate, propylene diisocyanate, butylene diisocyanate, cyclopentylene-1,3-diisocyanate, cyclohexylene-1,4-diisocyanate, azobenzene-4-4'-diisocyanate, diphenylsulphone4,4'-diisocyanate, dichlorohexamethylene diisocyanate, tetramethylene diisocyanate, pentamethylene diisocyanate, hexamethylene diisocyanate, 1-chlorobenzene-1,4-diisocyanate, furfurylidene diisocyanate and the like.

The polyol, the organic polyisocyanate and the chain extender may be individually heated preferably to a temperature of from about 60° C. to about 135° C., and then the polyol and chain extender may be substantially simultaneously mixed with the polyisocyanate. Preferably, the chain extender and the polyol, each of which has been previously heated, are first mixed and the resulting mixture is mixed with the heated polyisocyanate. This method is preferred for the reason that the extender and the polyol will not react prior to the introduction of polyisocyanate and rapid mixing with the polyisocyanate is thus facilitated.

Advantageously, the rate of reaction may be increased by adding any suitable catalyst to the reaction mixture such as tertiary amines and the like set forth in U.S. Pat. Nos. 2,620,516; 2,621,166 and 2,729,618 all incorporated herein by reference.

Other techniques for the production of thermoplastic polyurethanes useful in the context of the present invention are disclosed in the text of "Polyurethanes: Chemistry and Technology" Vol. 2, pp-299–452 by J. H. Saunders and K. C. Frisch, Interscience Publishers, New York (1964) incorporated herein by reference.

The above and other thermoplastic polyurethanes such as are disclosed in U.S. Pat. Nos. 2,621,166; 2,729,618; 3,214,411; 2,778,810 and 4,376,834, Canadian Patents 754,233; 733,577 and 842,325 all incorporated herein by reference, which are suitable in the context of the presently described invention, may be used to prepare the thermoplastic polyblends.

The grafted polybutadiene rubber suitable in the context of the invention is known in the art and such grafted rubbers are readily available in commerce. Such suitable grafted rubbers are available in commerce, notably from Bayer Corporation as ABS under the trademark Lustran.

Rubber modified mass, solution, mass/suspension or mass/solution polymerized monovinylidene aromatic/ethylenically unsaturated nitrile graft copolymers (herein collectively referred to as "graft polybutadiene rubber") suitable for use herein have discrete rubbery polymer particles dispersed therein, which particles serve as substrates having grafted thereto a portion of the monovinylidene aromatic copolymer as a grafted superstrate and the remainder of said monovinylidene aromatic copolymer constitutes a continuous matrix phase in which the indicated grafted rubbery particles are dispersed. The matrix phase of such copolymers typically constitutes from about 40 to about 95 (preferably from about 60 to about 80) % of the overall weight of the indicated rubber-modified compositions and the grafted copolymer constituents constitute the remainder thereof. Typically the grafted copolymer constituent will have a grafted superstrate to graftable rubber substrate ratio (i.e., a graft to rubber or "G/R" ratio) of from about 0.1:1 to about 2:1 (preferably from about 0.25:1 to about 0.8:1). The dispersed rubbery polymer particles within such copolymer will typically have an overall volume average particle size of from about 0.08 to about 10 (preferably from about 0.05 to about 5) microns.

Monovinylidene aromatic monomers suitable for use in the aforementioned rubber-modified monovinylidene aromatic/ethylenically unsaturated nitrile copolymers include styrene, alkyl substituted styrenes such as α-alkyl-styrene (e.g., α-methylenestyrene, α-ethylstyrene, etc.), various ring-substituted styrenes such as ortho or para-methylstyrene, ortho-ethylstyrene, 2,4-dimethylstyrene, etc., ring-substituted halo-styrenes such as chloro-styrenes, 2,4-chloro-styrene, etc. and the like. Such monovinylidene aromatic monomers (especially styrene) typically constitutes from about 55 to about 99 weight percent of said monovinylidene aromatic copolymer and preferably constitute from about 60 to 95 (more preferably from about 65 to about 90) weight percent thereof. Such monovinylidene aromatic copolymers are typically normally solid, hard (i.e., non-elastomeric) materials having a glass transition temperature in excess of 25° C.

Suitable ethylenically unsaturated nitrile monomer ingredients for use, typically as a minor constituent in (i.e., constituting from about 1 to about 45, preferably from 5 to 40 and more preferably from 10 to 35, weight percent of) the indicated monovinylidene aromatic copolymers include acrylonitrile, methacrylonitrile, ethylacrylonitrile, furmaronitrile, etc.

The indicated rubber modified monovinylidene aromatic copolymers can also optionally contain additional monomer ingredients, typically in relatively minor proportions such as, for example, from about 1 to about 25 (preferably from about 2 to about 15) weight percent on a rubber modified monovinylidene aromatic copolymer weight basis. Examples of such suitable optional monomer ingredients include ethylenically unsaturated anhydrides such as maleic anhydride; ethylenically unsaturated amides such as acrylamide, methacrylamide, etc.; esters (especially lower, e.g., $C_1$–$C_6$ alkyl esters) of ethylenically unsaturated carboxylic acids such as methyl methacrylate, 2-ethylhexylacrylate, etc.; ethylenically unsaturated dicarboxylic acid imides such as N-alkyl or N-aryl maleimides such as N-phenyl maleimide, etc.; and the like.

Preferably, the matrix phase portion of the above-described mass polymerized monovinylidene aromatic copolymer has a solubility parameter of from about 9.0 to about 10.2 (preferably from about 9.2 to 10.0) as calculated pursuant to the method described in Polymer Blends, Academic Press, pp 45–48, 1978, edited by D. R. Paul and S. Newman.

Suitable rubbery polymer materials for use as the dispersed rubbery particles, both within the mass polymerized rubber modified monovinylidene aromatic copolymer constituent hereof and within the emulsion polymerized grafted rubber concentrate ingredient hereof, include homopolymers of 1,3-conjugated alkadiene monomers; copolymers of from about 60 to about 99 weight percent of said 1,3-conjugated alkadienes with from about 1 to about 40 percent of one or more monoethylenically unsaturated monomers such as, for example, monovinyldiene aromatic monomers (e.g., styrene, etc.), and ethylenically unsaturated nitrites such as acrylonitrile, methacrylonitrile, etc., alkyl acrylate or methacrylate monomers such as methyl methacrylate and the like; ethylene/propylene copolymer rubbers and rubbery ethylene/propylene/non-conjugated diene copolymers; and the like. Especially preferred rubbery copolymers for use herein include polymers composed of from about 60 to 100 weight percent of 1,3-butadiene and from 0 to 40 weight percent of styrene or acrylonitrile. Typically, the indicated rubbery polymer materials are of a sort which have a glass transition temperature of –20° C. or lower and, preferably, said materials have a glass transition temperature of –30° C. or lower.

While not being particularly critical for the purposes of the present invention, it can nonetheless be noted that the mass polymerized rubber modified monovinylidene aromatic copolymers employed herein will typically comprise from about 1 to 35 (preferably from about 5 to 25) weight percent of the above-discussed dispersed rubbery polymer particles. The emulsion polymerized grafted rubber concentrate ingredient hereof will typically have a dispersed rubber polymer content of from about 35 to about 85 (preferably from about 40 to about 85 and most preferably from about 45 to about 80) weight percent on a grafted rubber concentrate weight basis.

The aforementioned mass polymerized monovinylidene aromatic graft copolymer hereof can be suitable by being prepared by way of any convenient conventional mass, solution, mass/suspension or mass/solution graft polymerization process conducted in the presence of the desired rubbery polymer material.

Suitable grafted rubber concentrate ingredients for use herein include relatively high rubber content emulsion polymerized graft copolymer ingredients wherein the grafted superstrate polymer thereof is a monovinylidene aromatic/ ethylenically unsaturated nitrile copolymer of the sort which has hereinbefore been more fully discussed and described in connection with the mass polymerized graft copolymer ingredient hereof. Also suitable for use as the grafted rubber concentrate ingredient herein are those wherein the grafted superstrate polymer is different from the above discussed monovinylidene aromatic/unsaturated nitrile copolymer and thus include those rubber concentrate ingredients wherein the grafted superstrate polymer is an acrylate or methacrylate polymer such as polymethyl methacrylate, the various methyl methacrylate copolymers and the like. Such grafted rubber concentrate compositions can be conveniently prepared in accordance with the various well known emulsion graft polymerization methods and techniques and are also available commercially, for example, from Rohm and Haas as Paraloid® EXL-3607 which is a polymethylmethacrylate grafted butadiene rubber material.

While not being particularly critical, it is generally desirable to employ a predominant proportion (e.g., from about 50 to about 95, preferably from about 60 to about 90, weight percent) of the indicated mass polymerized rubber modified monovinylidene aromatic copolymer ingredient in combination with a minor proportion (e.g., from about 5 to 50, preferably from about 10 to 40, weight percent) of the indicated relatively high rubber content emulsion polymerized rubber modified graft copolymer ingredient, said weight percentages being based only upon the combined weight of the two different types of rubber-modified graft copolymer ingredients. The dispersed rubbery particles associated with the emulsion polymerized graft copolymer ingredient will typically have an overall weight average particle size of from about 0.08 to about 0.8 micron and will constitute from about 10 to about 90 (preferably about 20 to 80) weight percent of the total dispersed rubbery polymer particle content within the rubber modified monovinylidene aromatic copolymer in question. The particle size distribution of said emulsion polymerized graft copolymer particles can be mono-modal or can, if desired in a particular instance, be of a bimodal or multi-modal character. The dispersed rubbery polymer particles of the mass polymerized component will typically have a weight average particle size of from about 0.5 to about 10 (preferably from about 0.8 to about 7) microns; will generally constitute from about 10 to about 90 (preferably from about 20 to about 80) weight percent of the total dispersed rubbery polymer particle content therein; and can also be of a monomodal, bimodal or multimodal particle size distribution.

As has been noted above, the above-described mass polymerized monovinylidene aromatic graft copolymer ingredient typically constitutes from about 19 to about 64 weight percent of the subject polymer blend compositions. In preferred instances, however, said ingredient constitutes from about 20 to about 60 (more preferably from about 35 to about 55) weight percent of such compositions. The emulsion polymerized grafted rubber concentrate typically constitutes from 1 to about 30 weight percent of the subject polymer blends and preferably constitutes from about 5 to about 20 or 24 weight percent thereof.

Particle size of the rubber component was measured using a Horiba Particle Size Analyzer model Capa 700, and the measurements were conducted at about 25 centigrade using a gradient mode.

The preparation of the inventive blends is carried out in an extruder, preferably a twin screw extruder, conventionally following procedures and using equipment which are well known in the art.

Shore A hardness, a critical characteristic of the suitable thermoplastic polyurethane is a material property well recognized in the art, measured in accordance with ASTM D-2240.

EXPERIMENTAL

Compositions representative of the invention have been prepared and used in extruding strips. The strips were thermoformed and their presently relevant properties determined. The resinous components used in the preparing the compositions are detailed below:

"TPU-PE" refers to Texin 985 polyurethane which is a thermoplastic resin based on polyether polyol having a shore A Hardness of 86 and about 61% of soft segments.

"TPU-PS" refers to Texin 285 polyurethane which is a thermoplastic resin based on polyester polyol having a shore A Hardness of 86 and about 66% of soft segments.

"ABS-1" refers to mass process polymerized ABS, having butadiene content of about 14% by weight, and an S/AN ratio of about 70/30 and that its volume average particle size is about 5 microns.

"ABS-2" refers to suspension process polymerized-ABS, having butadiene content of about 13% by weight, and a S/AN ratio of about 75/25 and that its volume average particle size is about 1 microns.

"ABS-3" refers to mass process polymerized-ABS, having butadiene content of about 13% by weight, and an S/AN ratio of about 75/25 and that its volume average particle size is about 0.8 microns.

"ABS-4" refers to mass process polymerized ABS having a polybutadiene content 15% and an S/AN ratio of about 70/30 and a volume average particle size of about 5 microns.

"ABS-5" refers to suspension polymerized ABS having a polybutadiene content 13% and an S/AN ratio of about 75/25 and a volume average particle size of about 5 microns.

"ABS-6" refers to emulsion polymerized-ABS having a polybutadiene content 38% and an S/AN ratio of about 70/30 and a volume average particle size of about 0.2 microns.

Strips measuring about 12 by 5 inches by 0.065 inch were prepared by extrusion following conventional procedures. The strips were then thermoformed at draw ratios of 1.3, 1.8 and 2.3. The gloss values of the thermoformed articles were determined in accordance with ASTM D 2457 and the shore A hardness values were determined in accordance with ASTM D 2240. The table below summarizes the results of the evaluation. The gloss (60 degree) data presented in Table 1 refer to thermoformed articles made of compositions containing 60% TPU and 40% ABS, at the indicated draw ratios.

TABLE 1

| Draw Ratio | No draw | 1.3 | 1.8 | 2.3 | *H |
| --- | --- | --- | --- | --- | --- |
| TPU-PE/ABS-1 | 37.4 | 26.5 | 21.9 | 4.9 | 92–93 |
| TPU-PS-ABS-1 | 55.2 | 41.8 | 35.4 | 8.6 | 94–95 |
| TPU-PE/ABS-2 | 26.2 | 18.7 | 12.9 | 4.3 | 94–96 |
| TPU-PS/ABS-2 | 65.8 | 41.8 | 28.3 | 10.5 | 91–92 |
| TPU-PE/ABS-3 | 7.1 | 12.7 | 6.5 | 3 | 95–97 |
| TPU-PS/ABS-3 | 49.6 | 37 | 43.9 | 11.8 | 97 |
| TPU-PE/ABS-4 | 25.8 | 17.7 | 13.7 | 4 | 92–93 |
| TPU-PS/ABS-4 | 51.1 | 41.7 | 34.5 | 9.2 | 95 |
| TPU-PE/ABS-5 | 49.1 | 34.4 | 20.1 | 6.3 | 93 |
| TPU-PS/ABS-5 | 46.8 | 35.3 | 35.4 | 10.6 | 93–94 |

*H Shore A hardness.

In a second set of experiments, compositions representative of the invention were prepared and extruded to form, strips. The strips were thermoformed as stated above. The gloss (60 deg) of thermoformed articles made of the compositions are set below (Table 2) in comparison to corresponding, similar compositions containing polyester-polyol based TPU (TPU-PS) which are outside the scope of the present invention. The indicated ratio is the weight percent ratio between the resinous components (TPU to ABS) in the compositions. The strips were then thermoformed to different draw ratios of 1.3, 1.8 and 2.3. The 60 degree gloss values are reported in Table 2 below.

TABLE 2

| Draw Ratio | | 1.3 | 1.8 | 2.3 | *H |
| --- | --- | --- | --- | --- | --- |
| TPU-PE/ABS-6 | 60/40 | 13.8 | 11.3 | 5.3 | 95 |
| TPU-PS/ABS-6 | 60/40 | 67.6 | 69.1 | 61.0 | 95 |
| TPU-PE/ABS-6 | 80/20 | 40.7 | 35.9 | 11.2 | 91 |
| TPU-PS/ABS-6 | 80/20 | 83.5 | 82.5 | 69.8 | 91 |
| TPU-PE/ABS-4 | 51/49 | 18.7 | 12.2 | 4.0 | 95 |
| TPU-PS/ABS-4 | 51/49 | 23.1 | 17.0 | 5.6 | 95 |
| TPU-PE/ABS-4 | 69/31 | 35.7 | 32.4 | 9.1 | 92 |
| TPU-PS/ABS-4 | 69/31 | 53.3 | 40.4 | 13.8 | 92 |
| TPU-PE/ABS-4 | 80/20 | 59.3 | 52.4 | 17.7 | 91 |
| TPU-PS/ABS-4 | 80/20 | 71.5 | 70.7 | 34.4 | 91 |
| TPU-PE/ABS-4 | 69/31 | 57.5 | 51.6 | 20.8 | 93 |
| TPU-PS/ABS-4 | 69/31 | 80.0 | 70.7 | 37.4 | 93 |

*H Shore A hardness.

The results clearly show the criticality of TPU-PE in the context of the invention. The gloss values characterizing the thermoformed articles made of compositions containing TPU-PE are considerably lower than the corresponding articles containing TPU-PS.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic composition comprising a resinous blend of (i) about 51 to 85% by weight of a polyether-polyol based thermoplastic polyurethane having a Shore A hardness of 65 to 87, and (ii) about 15 to 49% by weight of grafted rubber selected from the group consisting of homopolymer of 1,3-conjugated alkadiene monomers; copolymer of from about 60 to about 99 weight percent of 1,3-conjugated alkadiene with about 1 to about 40 percent of at least one of monovinylidene aromatic monomer and ethylenically unsaturated nitrile; ethylene/propylene copolymer, and rubbery ethylene/propylene/non-conjugated diene copolymer having a grafted phase containing a copolymer of a monovinylidene aromatic monomer and an ethylenically unsaturated nitrile, said % being relative to the weight of said blend, said composition being characterized in that a thermoformed article prepared therefrom has a 60 degree gloss value lower than the identically thermoformed article prepared from a corresponding composition wherein thermoplastic polyurethane is based on a polyester polyol said blend being free of additional acrylic polymer components.

2. The composition of claim 1 wherein said (i) is present in said blend in an amount of 55 to 85% relative to the weight of the blend.

3. The composition of claim 1 wherein said rubber is characterized in that its weight average particle size is about 0.08 to 10 microns.

4. A thermoplastic composition comprising a resinous blend of (i) 60 to 80% relative to the weight of the blend of a polyetherpolyol based thermoplastic polyurethane having a Shore A hardness of 65 to 87 and (ii) 20 to 40% relative to the weight of said blend of mass-ABS containing rubber in the form of particles having a weight average particle size of about 0.8 to 7 microns, said composition characterized in that a thermoformed article prepared therefrom has a 60 degree gloss value lower than the identically thermoformed article prepared from a corresponding composition wherein thermoplastic polyurethane is based on a polyester polyol said blend being free of additional acrylic polymer components.

5. A thermoformed article having a low 60 degree gloss value comprising a resinous blend of (i) about 51 to 85% by weight of a polyether-polyol based thermoplastic polyurethane having a Shore A hardness no greater than 87 and (ii) about 15 to 49% by weight of grafted rubber selected from the group consisting of homopolymer of 1,3-conjugated alkadiene monomers; copolymer of from about 60 to about 99 weight percent of 1,3-conjugated alkadiene with about 1 to about 40 percent of at least one of monovinylidene aromatic monomer and ethylenically unsaturated nitrile;

ethylene/propylene copolymer and rubbery ethylene propylene/non-conjugated diene copolymer having a grafted phase containing a copolymer of a monovinylidene aromatic monomer and an ethylenically unsaturated nitrile, said % being relative to the weight of said blend said value being lower than that of an identically thermoformed article comprising a corresponding composition wherein thermoplastic polyurethane is based on polyester-polyol, said blend being free of additional acrylic polymer components.

6. The article of claim 5 wherein said (ii) is ABS resin.

7. The article of claim 6 wherein said (i) is present in said blend in an amount of 55 to 85% by weight.

* * * * *